United States Patent [19]
Bordignon

[11] Patent Number: 4,573,095
[45] Date of Patent: Feb. 25, 1986

[54] MAGNETIC TAPE BACKING LEAF SPRING ASSEMBLY PARTICULARLY FOR COMPACT CASSETTES

[75] Inventor: Abramo Bordignon, Senago, Italy

[73] Assignee: A.T.B. S.p.A., Senago, Italy

[21] Appl. No.: 24,290

[22] Filed: Mar. 27, 1979

[30] Foreign Application Priority Data

Apr. 6, 1978 [IT] Italy ................ 22030 A/78
Jun. 1, 1978 [IT] Italy ................ 22008/78[U]

[51] Int. Cl.⁴ .................... G11B 5/74; G11B 23/00
[52] U.S. Cl. .................... 360/130.31; 242/198
[58] Field of Search ............ 360/132, 130.31, 130.32, 360/130.33, 133; 242/198, 200, 55.19 A; 24/81 BM, 81 R

[56] References Cited

U.S. PATENT DOCUMENTS

| | | | |
|---|---|---|---|
| 2,074,055 | 3/1937 | Irwin | 24/81 R |
| 2,131,093 | 9/1938 | Cage | 24/81 BFH |
| 2,514,571 | 7/1950 | Fry | 24/81 R |
| 2,517,213 | 8/1950 | Kautenberg | 15/244 R |
| 2,614,556 | 10/1952 | Staunt | 15/244 R |
| 3,378,266 | 4/1968 | Karecki | 360/130.32 |
| 4,087,845 | 5/1978 | Saito | 360/130.33 |
| 4,131,243 | 12/1978 | Machida | 360/132 X |
| 4,148,443 | 4/1979 | Lundquist | 242/198 X |

Primary Examiner—John H. Wolff
Attorney, Agent, or Firm—Guido Modiano; Albert Josif

[57] ABSTRACT

A magnetic tape backing leaf spring assembly, particularly for compact cassettes, comprises an elastic reed and a low frictional coefficient block engaging therewith by means of a plurality of teeth projecting from the reed.

4 Claims, 12 Drawing Figures

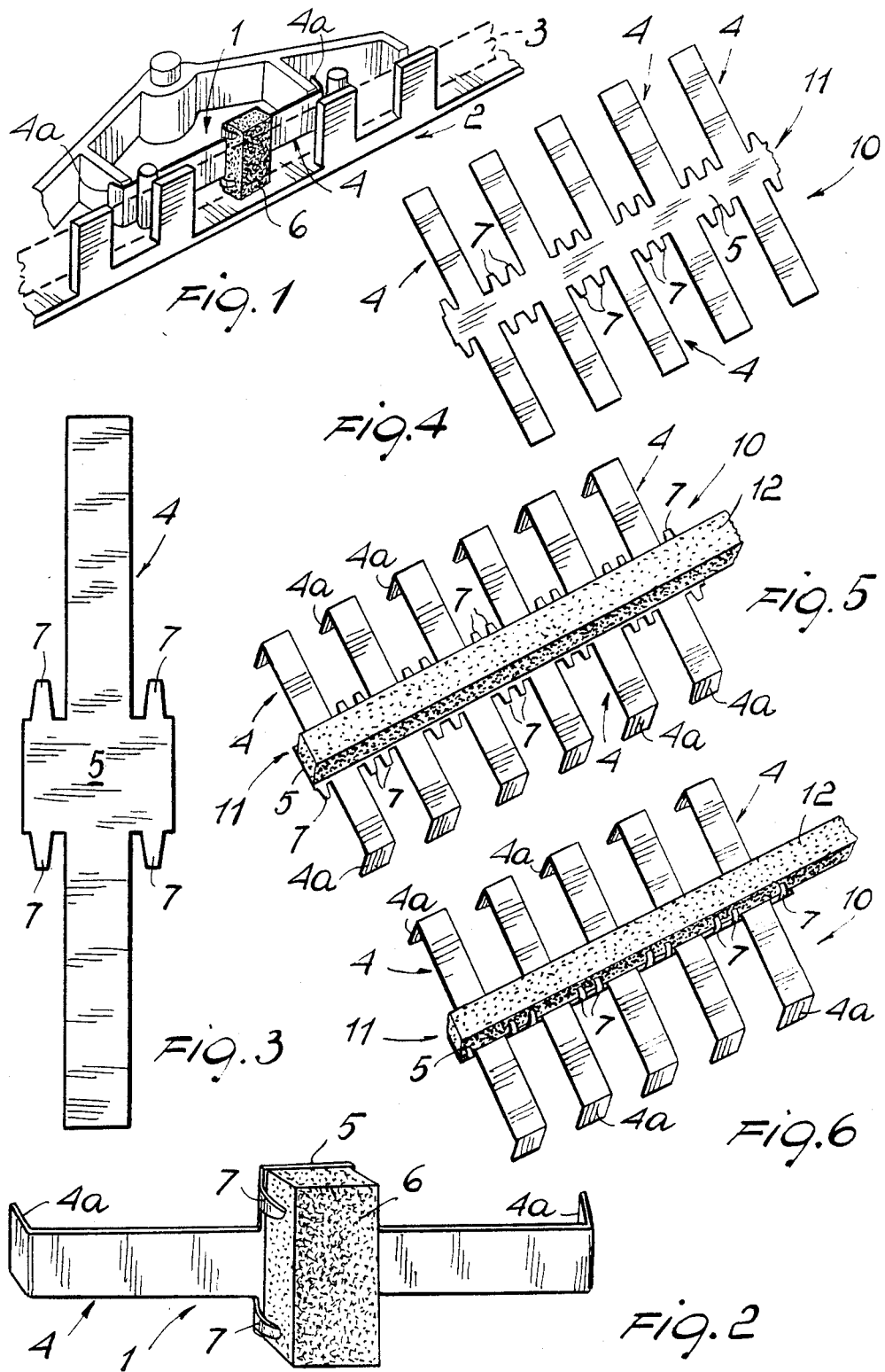

MAGNETIC TAPE BACKING LEAF SPRING ASSEMBLY PARTICULARLY FOR COMPACT CASSETTES

BACKGROUND OF THE INVENTION

This invention relates to a magnetic tape backing leaf spring, or shoe, assembly providing back support for a running magnetic tape, in particular of the type contained in "cassette" housings and the like recording devices, for the purpose of elastically biasing a running magnetic tape to contact a magnetic head in a tape recorder/player or the like apparatus.

As is known, currently available playing cassettes or recording cassettes are provided, for biasing the tape to contact a playing or recording magnetic head as well as for maintaining that contact relationship, with an elastic leaf spring comprising a metal reed which carries a felt pad or the like adhesively secured to the central portion thereof. This felt pad is selected for direct contact with the magnetic tape by virtue of its low frictional resistance, the elastic metal reed taking up the pressure applied by the magnetic head to the tape and ensuring continued contact of the latter without excessive drag.

A tape backing leaf spring assembly so constructed is quite satisfactory as far as its action on the magnetic tape is concerned, but has serious disadvantages from the standpoint of the operational reliability. Owing to the friction set up by the tape running past the felt pad—quite appreciable, albeit somewhat reduced—it may happen after a number of hours of operation that the felt pad separates from, or is dislodged along the metal reed, thus nullifying the action expected from the leaf spring. In such conditions, the contact between the magnetic tape and magnetic head becomes questionable, and the replacement of the leaf spring assembly requires that the cassette housing be opened up, an operation which is not usually within the capabilities of a normal user.

Thus, the separation and dislodging of the felt pad from the reed of the leaf spring represent a serious drawback which may effect the useability of the cassette as a whole, nor can any of the adhesives currently used for retaining the felt pad position obviate it, when the apparatus is utilized in a hot and damp climate.

Thus, the need is felt for different solutions to the problem of securing the felt pad to the metal reed, which solutions should not contemplate the use of adhesives, or only utilize them for seconding purposes. Accordingly, leaf springs have been proposed which have retention lips at their middle portions tailored to the size of the felt pad and defining a substantially box-like sectional profile at least partially embracing said felt pad. In particular, the box-like sectional profile engages the pad corners.

That approach is quite effective to prevent definitively the felt pad from coming loose, but has the very serious disadvantage of raising the manufacturing costs considerably, and above all of preventing the adoption of continuous manufacturing methods for the leaf springs on automatic equipment. In fact, conventional leaf springs with adhesively attached felt pads are obtained by combining a continuous band consisting of a row of abutting reeds with a further continuous band formed by the stock material wherefrom the felt pads originate, which is glued continuously to the former. The two-band combination is then cut to produce individual leaf spring blanks. On the contrary the leaf springs comprising a reed which clads the felt pads box-like have to be individually finished and the single felt pads have to be inserted into the respective seats. Accordingly the box-encased felt pad leaf springs are only employed in magnetic tape cassettes of higher quality that may warrant the increased cost. However, for the great majority of the tape cassettes available commercially, the situation is still unchanged, i.e. leaf springs with glued-on felt pads are used which are quick and economical to manufacture but unsatisfactory as regards the reliability.

SUMMARY OF THE INVENTION

This invention sets out to remedy such an unfavorable situation by providing a solution to the technical problem of firmly securing a felt pad or the like member to a metal reed without appreciably aggravating the cost of the tape backing leaf spring assembly thus obtained, and above all without interfering with the continuous process as customarily employed for manufacturing leaf spring assemblies having the felt pad or the like member adhesively applied.

This object is achieved by a magnetic tape backing leaf spring assembly according to the invention, providing back support for a running magnetic tape, comprising an elastic reed, and low frictional coefficient block engaged with said reed, characterized in that said block is engaged with said reed by means of a plurality of teeth projecting from said reed.

BRIEF DESCRIPTION OF THE DRAWINGS

Further features and advantages will become more apparent from the following description of a preferred but not limitative embodiment of the invention, illustrated by way of example in the accompanying drawings, where:

FIG. 1 is an enlarged scale cutaway view of that portion of a magnetic tape cassette wherein the leaf spring assembly according to this invention is positioned in contact with the magnetic tape;

FIG. 2 shows in perspective a leaf spring assembly according to the invention;

FIG. 3 illustrates the flat metal reed of the leaf spring assembly of FIG. 2;

FIGS. 4, 5 and 6 show how leaf spring assemblies according to this invention are formed from continuous band stock;

DESCRIPTION OF A PREFERRED EMBODIMENT

Figure 7:
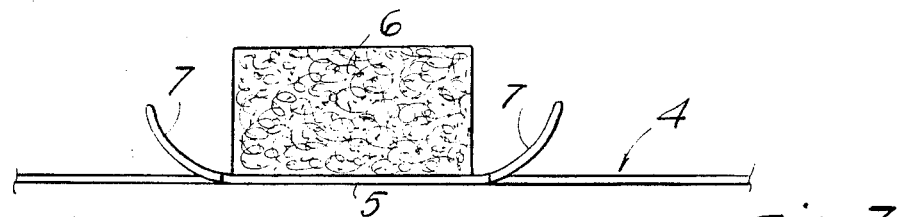
FIGS. 7, 8 and 9 illustrate more in detail how the felt pad or block of the leaf spring is anchored to the metal reed which supports it.

With reference to the recited drawing figures, the magnetic tape backing leaf spring assembly according to this invention, also known in the art as "shoe", is generally indicated at 1 and is intended, as shown in FIG. 1, for insertion in the housing 2 of a tape cassette to contact a magnetic tape 3.

The leaf spring 1 comprises a reed 4, having at its ends bent portions 4a for correct positioning of the leaf spring between locating lugs on the housing; an expanded portion 5 of the reed 4, located centrally to the reed and preferably in the shape of a rectangle having its larger sides arranged transversally to the major extension axis of the reed 4; a block 6, preferably comprising a felt pad of parallelepipedal shape and covering substantially the entire expanded portion 5; and teeth or tabs 7 projecting from the expanded portion 5 and caused to clamp the sides of the block 6.

As shown in FIGS. 1 to 6, the teeth 7 project advantageously from the side edges of the expanded portion 5 which lay transversal to the major dimension axis of the reed 4, and are formed in pairs, each pair having their teeth symmetrically arranged with respect to the expanded portion 5 and clamping opposed sides of the block 6. As shown more clearly in FIG. 9, the teeth 7 in their working position are curved and mutually converging such as to clamp the block 6 therebetween by penetrating the sides of the block with their tips.

Such clamping of the block 6 by the teeth 7, with the teeth pointed ends arranged to penetrate the sides of the block 6, is made easier by the fact that, as shown in the drawings, the expanded portion 5 is slightly larger in plan view than the block 6: thus, the mutual convergence of the teeth 7 is enhanced.

Figure 10:
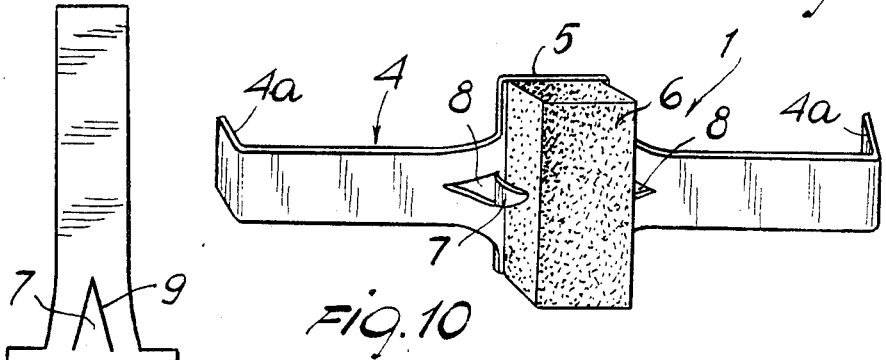
FIG. 10 shows in perspective a further leaf spring assembly according to the invention.

According to a peculiar variation of the above, the block 6 is clamped to the expanded portion 5 of the reed 4 by teeth 7 formed directly in the elastic reed 4 and curled up to clamp the block 6 itself, as shown in FIG. 10. After curling the teeth 7, corresponding recesses 8 are created in the elastic reed 4.

Figure 11:
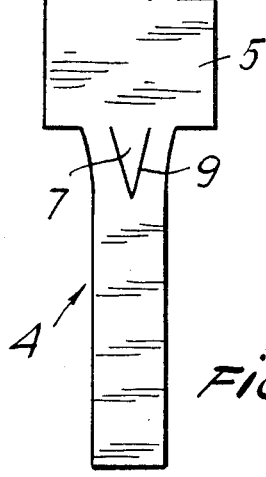
FIG. 11 shows the flat reed of the leaf spring assembly of FIG. 10.

FIG. 11, in particular, shows the contours of the teeth 7 while flat, directly after the punching operation. In actual practice, a wedge-like shape is provided by means of "V" cuts 9, the open ends whereof are adjacent the edges of the block 6. Advantageously, the teeth 7 punched out from the reed are but two in number and are obtained with such "V" cuts 9 arranged contiguously to two opposed edges of the block 6 at mirror-like positions, to extend along said major dimension axis of the elastic reed 4.

To avoid stress concentration areas, as due to localized dimensional reduction of the reed 4 owing to the presence of the recesses 8, the "V" cuts 9 may define very narrow angles, thereby the teeth have a depth or height dimension which is greater than their root or base width. Thus, the transverse outline dimension of the recesses 8 formed in the elastic reed 4 is minimal.

Advantageously, moreover, the elastic reed 4, at the area of the recesses 8, is enabled to expand gradually towards the expanded portion 5 such as to define, at the sides of the "V" cuts 9, radiused connections to the same expanded portion 5 which have substantially constant transverse dimensions that decrease gradually towards the expanded portion.

Figure 12:
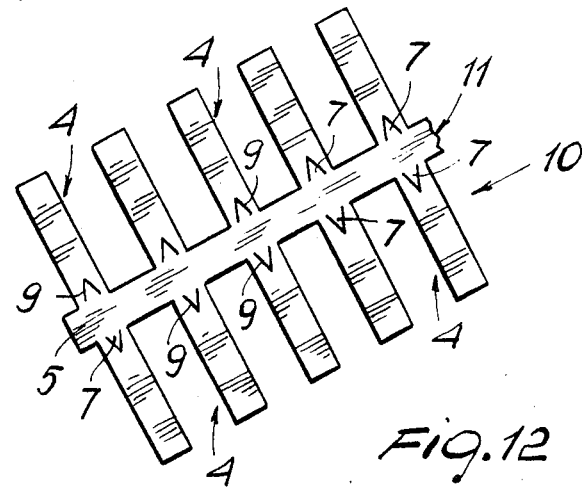
FIG. 12 shows a series of reeds cut from a band stock and not yet separated from one another.

FIG. 12 illustrates how a series of reeds 4 according to this variation of the invention can be advantageously formed in neatly rectilinear rows, with attendant advantages of an economical use of the stock material. The leaf springs provided with teeth 7 which are cut internally to the reeds, in other words, permit extremely uniform and regular metal portions to be punched out of a metal band for further application, such as to reduce substantially to zero the material waste.

In both the variations described, the reed 4, with its positioning end portions 4a, its expanded portion 5, and teeth 7, define, while flat, a flat contoured plate (FIGS. 3 and 11) which is punched out of a metal sheet. Advantageously, owing to the position of the teeth 7 which project from the sides of the expanded portion 5 transversally to the major dimension axis of the reed 4, it becomes possible to form several such plates together, e.g. arranged in rows 10, as shown in FIGS. 4 and 12, where the reeds 4 form sort of a double comb with a central connective strip 11 formed by the sequentially arranged expanded portions 5.

The possibility of forming the reeds in rows is advantageous not only because the same can be produced in large quantities and at a low cost by punching them out of sheet metal, but also because it allows a continuous fabrication of the leaf spring assemblies 1 complete with the block 6. In fact, onto the central strip 11 of a row 10 of plates, as formed continuously from a metal sheet fed parallel to the central strip 11, a continuous row 12 of bar shaped low frictional coefficient material can be deposited and positioned. Such a continuous row 12 may be fed, for example, from a coil, parallel and concurrently with the direction of advance of the row 10 of plates, and then initially joined to the same, e.g. by means of an adhesive (FIG. 5). Thereafter, the row 10 of plates and the continuous row 12, thus joined together, are engaged fixedly to each other by clamping through the bending of the teeth 7 (FIG. 6). Finally, the resulting band is cut for separating discrete shaped plates 8 and simultaneously forming the blocks 6.

Figure 8:
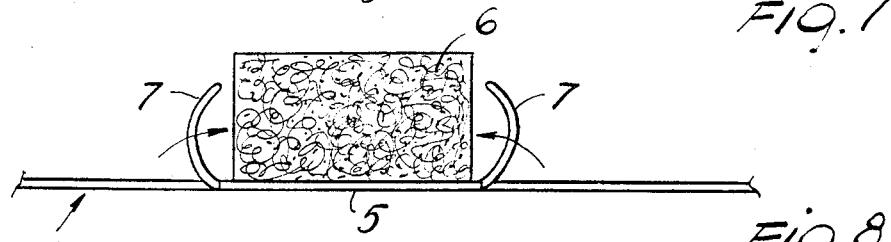
Figure 9:
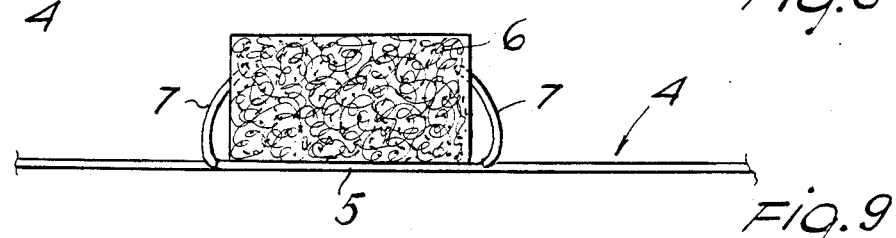

FIGS. 7, 8 and 9 show in particular the bending step for the teeth 7. In the figures, the low frictional coefficient material is indicated at 6, like the blocks, because the bending of the teeth 7 is independent of the presence of band or block materials between the teeth. In fact, albeit at a lower production output, it is also possible to work on shaped plates which have been formed discretely.

Specifically, FIG. 7 shows in detail that the teeth 7 are initially bent to a hook at their ends, while the root or base thereof remains substantially flat. Obviously, it is unimportant whether the teeth 7 are bent to an arc of a circle or an angle, by providing an intermediate flex point. Then the teeth 7 are brought closer to one another (FIG. 8). During this step, they retain their shape unaltered, and only their position is changed by tilting them about their bases, along a line of connection to the expanded portion 5. Upon completion of the mutual approach operation, the teeth 7 are partly embedded in the block 6 or continuous row 12, as shown in FIG. 9.

The anchoring process just described is of special importance in that, without bending the teeth 7 prior to their approach to the block 6, the block itself would only be retained by pressure, with teeth 7 acting mainly as containment edges; thus, the engagement would not be a positive one.

The invention achieves its objects. In fact, a leaf spring or shoe assembly has been provided wherein the engagement between the low frictional coefficient block and elastic reed, which carries the block, is highly reliable. Furthermore, in the improved leaf spring assembly of the invention, that positive engagement is provided without prejudice for the possibility of continuously manufacturing such leaf springs, and accordingly without appreciably increasing production costs. The leaf spring assemblies according to this invention can thus replace advantageously any of the currently available tape backing leaf spring assemblies, either for cheap playing cassettes or higher quality sophisticated magnetic tape cassettes.

Obviously, the materials and dimensions used may be any ones, and details such as the shape of the teeth, the shape of the reed, and that of the block, etc. may be selected as desired.

I claim:

1. A magnetic tape backing leaf spring and pad assembly for providing back support for a running magnetic tape, comprising a resilient reed and a low friction coefficient pad, said reed having an intermediate portion defining a surface for securing thereon said pad, said pad having a thickness dimension extending perpendicular to said surface and a width dimension extending parallel to said surface, wherein said reed has at least one pair of opposite tooth formations punched out therefrom astride of said intermediate portion at a distance and opposite to each other and projecting from said reed transverse to said surface thereof, the extension of said tooth formations in a direction perpendicular to said surface being less than the thickness dimension of said pad and the distance between at least two opposite points of said tooth formations being less than said width dimension of said pad thereby to clamp said pad therebetween, wherein said opposite tooth formations have tips converging to each other thereby to penetrate into said pad and wherein said tooth formations taper towards their tips and wherein said reed has a progressively increasing width in the zone where said tooth formations are punched out therefrom thereby to compensate for the void space left by punched out tooth formations in the reed body.

2. A magnetic tape backing leaf spring and pad assembly for providing back support for a running magnetic tape, comprising a resilient elongated reed and a low friction coefficient pad, said reed including an enlarged intermediate portion having a contour including one pair of opposite edges extending transverse to the longitudinal direction of said reed at each lateral side thereof, said intermediate portion defining a surface for securing thereon said pad, said pad having a thickness dimension extending perpendicular to said surface and a width dimension extending parallel to said longitudinal extension of said reed, wherein according to the improvement said enlarged intermediate portion has on each of said opposite pairs of edges at least one pair of opposite tooth formations projecting from said edges transverse to said surface at a distance from each other, the extension of said tooth formations in a direction perpendicular to said surface being less than the thickness dimension of said pad and the distance between at least two opposite points of said tooth formations being less than said width dimension of said pad thereby to clamp the pad therebetween.

3. An assembly according to claim 2, wherein said opposite tooth formations have tips converging to each other thereby to penetrate into said pad.

4. An assembly according to claim 3, wherein said tooth formations taper towards their tips.

* * * * *